United States Patent
Watanabe

(10) Patent No.: US 10,344,838 B2
(45) Date of Patent: Jul. 9, 2019

(54) PLANETARY ROLLER SPEED CHANGER

(71) Applicant: JTEKT CORPORATION, Osaka-shi, Osaka (JP)

(72) Inventor: Hajime Watanabe, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 86 days.

(21) Appl. No.: 15/810,493

(22) Filed: Nov. 13, 2017

(65) Prior Publication Data

US 2018/0142765 A1 May 24, 2018

(30) Foreign Application Priority Data

Nov. 18, 2016 (JP) ................. 2016-224598

(51) Int. Cl.
*F16H 13/06* (2006.01)
*B65H 5/06* (2006.01)
*F16H 57/00* (2012.01)

(52) U.S. Cl.
CPC ............. *F16H 13/06* (2013.01); *B65H 5/06* (2013.01); *F16H 57/0037* (2013.01); *B65H 2403/481* (2013.01); *B65H 2801/03* (2013.01)

(58) Field of Classification Search
CPC ........ F16H 13/06; F16H 57/0037; B65H 5/06
See application file for complete search history.

(56) References Cited

U.S. PATENT DOCUMENTS

| | | | | |
|---|---|---|---|---|
| 4,994,005 A * | 2/1991 | Rennerfelt | ............... | F16D 3/04 475/162 |
| 5,062,823 A * | 11/1991 | Ra | ............... | F16H 3/721 475/150 |
| 5,123,883 A * | 6/1992 | Fukaya | ............... | F16H 1/32 475/162 |
| 5,248,283 A * | 9/1993 | Eckhardt | ............... | F16D 3/72 464/149 |
| 5,951,427 A * | 9/1999 | Schroeder | ............... | F16H 1/32 475/178 |
| 6,019,697 A * | 2/2000 | Colletti | ............... | F16H 3/54 475/285 |
| 6,039,668 A * | 3/2000 | Kolstrup | ............... | F16H 13/06 475/183 |
| 7,465,248 B2 * | 12/2008 | Katoh | ............... | F16H 35/10 475/264 |
| 8,672,792 B2 * | 3/2014 | Tozaki | ............... | F16H 13/08 475/183 |

(Continued)

FOREIGN PATENT DOCUMENTS

| | | |
|---|---|---|
| JP | H09-152003 A | 6/1997 |
| JP | 2015-113931 A | 6/2015 |

*Primary Examiner* — Patrick H Mackey
(74) *Attorney, Agent, or Firm* — Oliff PLC

(57) ABSTRACT

An axial end of an output shaft facing toward an input shaft has a first hole that is concentric with the output shaft and that axially extends to a predetermined depth. An axial end of the input shaft facing toward the output shaft has a second hole that is concentric with the input shaft and that axially extends to a predetermined depth. A connection pin is inserted in the first hole and the second hole to connect the first hole and the second hole. When the output shaft and the input shaft axially approach each other, the connection pin interposed between the output shaft and the input shaft allows the output shaft and the input shaft to avoid coming into contact with each other.

4 Claims, 4 Drawing Sheets

(56) References Cited

U.S. PATENT DOCUMENTS

| | | | |
|---|---|---|---|
| 9,239,098 B2* | 1/2016 | Watanabe | F16H 57/082 |
| 9,797,476 B2* | 10/2017 | Watanabe | F16C 19/16 |
| 2015/0167821 A1 | 6/2015 | Watanabe | |
| 2017/0197503 A1* | 7/2017 | Yukishima | B60K 7/00 |
| 2018/0363694 A1* | 12/2018 | Ohno | F16C 3/02 |

* cited by examiner

PLANETARY ROLLER SPEED CHANGER

INCORPORATION BY REFERENCE

The disclosure of Japanese Patent Application No. 2016-224598 filed on Nov. 18, 2016 including the specification, drawings and abstract, is incorporated herein by reference in its entirety.

BACKGROUND OF THE INVENTION

1. Field of the Invention

The invention relates to a planetary roller speed changer.

2. Description of Related Art

A feeding speed of a sheet in a sheet feeding mechanism of a printer or a copier needs to be precisely controlled for high quality printing. To meet this need, a drive device of a sheet feeding mechanism employs a planetary roller speed changer that is less likely to cause irregular rotation. A planetary roller speed changer 70 illustrated in FIG. 3 includes a stationary ring 12, an input shaft 14 concentric with the stationary ring 12, and multiple planetary rollers 16. The planetary rollers 16 are located between the stationary ring 12 and the input shaft 14. Revolving motion of the planetary rollers 16 caused by rotation of the input shaft 14 is outputted as rotation of a carrier 18 (Japanese Patent Application Publication No. 2015-113931 (JP 2015-113931 A)).

The planetary rollers 16 are in rolling contact with the stationary ring 12 and the input shaft 14. When the axis of the planetary rollers 16 is parallel to the axis of the stationary ring 12, the planetary rollers 16 have the largest inscribed diameter. Thus, in general, the axis of the planetary rollers 16 is parallel to a rotational axis m. However, since the planetary rollers 16 are elastically deformable, the planetary rollers 16 may revolve around the input shaft 14 with their axis tilted relative to the rotational axis m. The state where the axis of the planetary rollers 16 is tilted relative to the rotational axis m is called "skew".

If the planetary rollers 16 rotate while being skewed, a contact position between the input shaft 14 and the planetary rollers 16 is axially displaced. As a result, the input shaft 14 may be axially displaced and come into contact with an output shaft 20. The rotation speed of the output shaft 20 is reduced relative to the rotation speed of the input shaft 14 so that the input shaft 14 and the output shaft 20 rotate at different speeds. If the input shaft 14 and the output shaft 20 come into contact with each other, the contact portion between the input shaft 14 and the output shaft 20 may wear, and the output shaft 20 may rotate irregularly. In one known technique, a ball 72 is interposed between the output shaft 20 and the input shaft 14 in order to allow the output shaft 20 and the input shaft 14 to avoid coming into direct contact with each other (FIG. 6 of Japanese Patent Application Publication No. H9-152003 (JP H9-152003 A)). According to JP H9-152003 A, the end surface of the output shaft 20 that abuts against the ball 72 is flattened. This allows the ball 72 and the output shaft 20 to be in point contact with each other, thus reducing sliding friction at the contact portion.

As described above, when the ball 72 is interposed between the input shaft 14 and the output shaft 20, the surface in contact with the ball 72 needs to be flattened. In general, each of the input shaft 14 and the output shaft 20 has a center hole 74 at their axial end to determine their shaft center when grinding their diameter (refer to FIG. 4). The center hole 74 includes a hole that axially extends to a predetermined depth and an inclined surface 75 around the opening of the hole. As illustrated in FIG. 4, when the ball 72 is disposed directly between the input shaft 14 and the output shaft 20, the ball 72 is in line contact with the entire circumference of the inclined surface 75 of the center hole 74 in each of the input shaft 14 and the output shaft 20. Under this condition, when the input shaft 14 and the output shaft 20 rotate relative to each other, sliding occurs between the ball 72 and the inclined surface 75 of at least one of the input shaft 14 and the output shaft 20. This sliding friction causes irregular rotation of the output shaft 20. If the sliding contact causes the inclined surface 75 or the ball 72 to wear, the planetary roller speed changer 70 may lose functionality.

In order to avoid such situations, in the planetary roller speed changer 70 illustrated in FIG. 3, a plug 76 is inserted in the center hole 74 in the output shaft 20 so that the surface abutting against the ball 72 can be flattened. However, inserting the plug 76 or flattening the surface in contact with the ball 72 by grinding the shaft end to remove the center hole 74 tends to complicate assembly of the planetary roller speed changer and increase manufacturing cost.

SUMMARY OF THE INVENTION

A purpose of the invention is to provide a planetary roller speed changer that allows an output shaft and an input shaft to be axially placed in position by simple structure, thus reducing assembly man-hours and manufacturing cost.

An aspect of the invention provides a planetary roller speed changer including the following: an input shaft; a stationary ring concentric with the input shaft and located radially outward from the input shaft; multiple planetary rollers disposed between the input shaft and the stationary ring and in rolling contact with an outer periphery of the input shaft and an inner periphery of the stationary ring; multiple drive pins each inserted in a space defined by an inner periphery of a corresponding one of the planetary rollers; a carrier that supports the multiple drive pins together; an output shaft concentric with the input shaft and fixed to the carrier; and a connection pin. An axial end of the output shaft facing toward the input shaft has a first hole that is concentric with the output shaft and that axially extends to a predetermined depth. An axial end of the input shaft facing toward the output shaft has a second hole that is concentric with the input shaft and that axially extends to a predetermined depth. The connection pin is inserted in the first hole and the second hole to connect the first hole and the second hole. When the output shaft and the input shaft axially approach each other, the connection pin interposed between the output shaft and the input shaft allows the output shaft and the input shaft to avoid coming into contact with each other.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
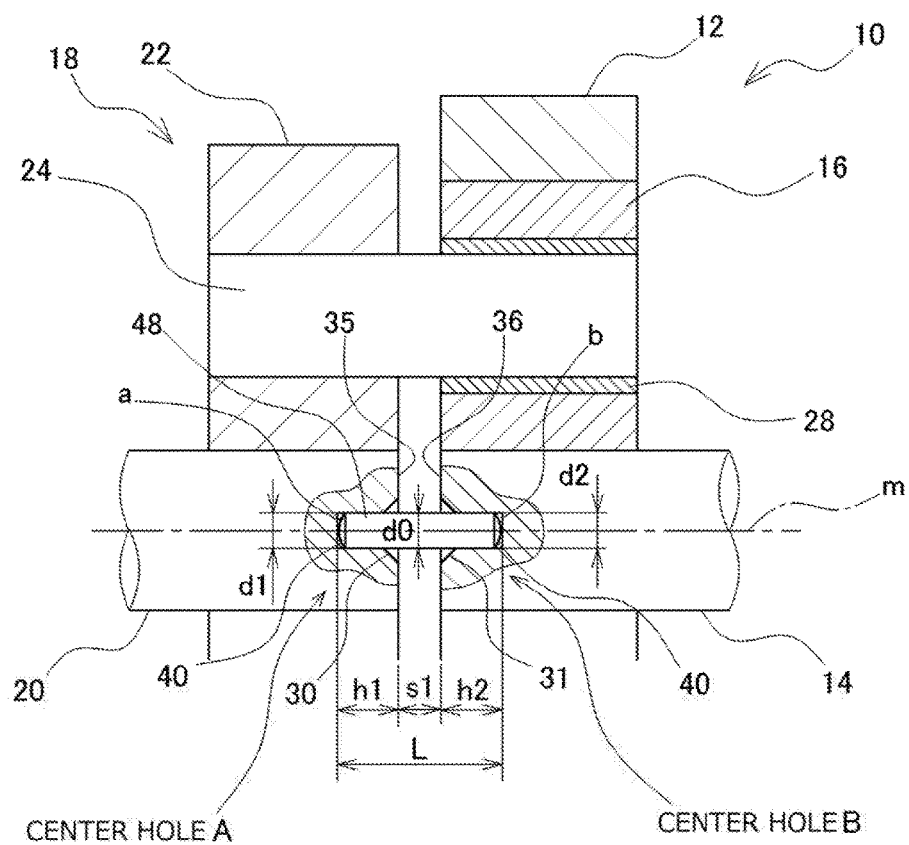
FIG. 1 is an enlarged, axial cross-sectional view illustrating a main part according to a first embodiment of the invention.

A planetary roller speed changer 10 according to a first embodiment of the invention is described in detail with reference to the drawings. FIG. 1 is an enlarged, axial cross-sectional view illustrating a main part according to the first embodiment. The first embodiment differs in structure from the related art in portions where an input shaft 14 and an output shaft 20 axially face each other and is equivalent in structure to the related art in the other portions. The structures common to the first embodiment and the related art are represented by the same reference symbols and described first with reference to FIG. 3, and then the structure unique to the first embodiment are described in detail with reference to FIG. 1. In the description below, a direction parallel to the rotational axis m is referred to as axial or axially, a direction perpendicular to the rotational axis m is referred to as radial or radially, and a direction around the rotational axis m is referred to as circumferential or circumferentially.

Figure 3:
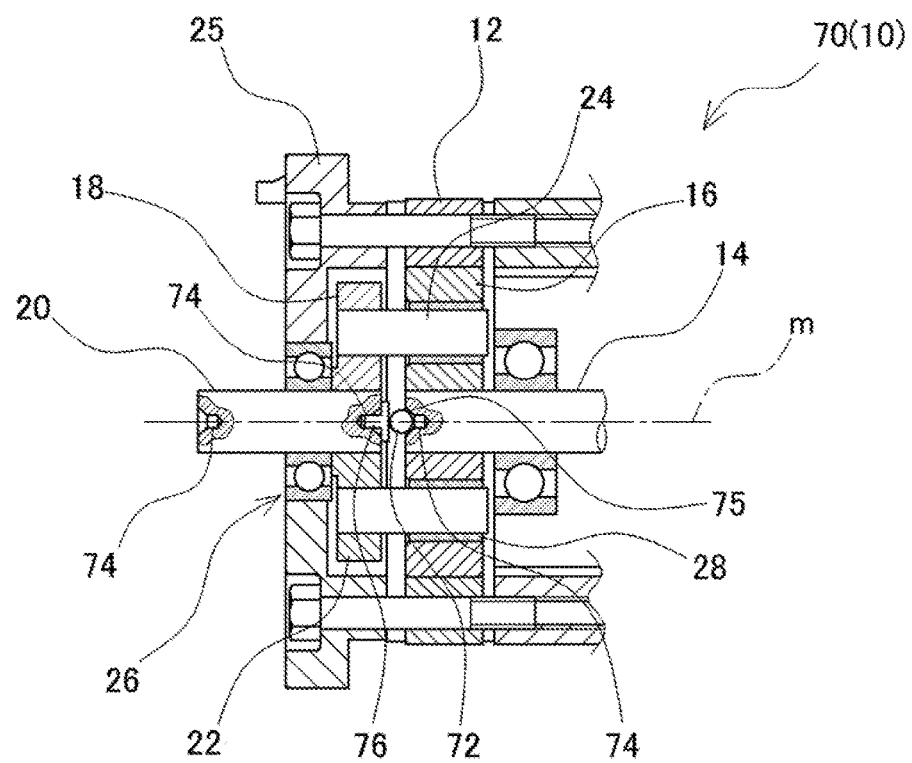
FIG. 3 is an axial cross-sectional view illustrating a planetary roller speed changer according to the related art.
Figure 4:
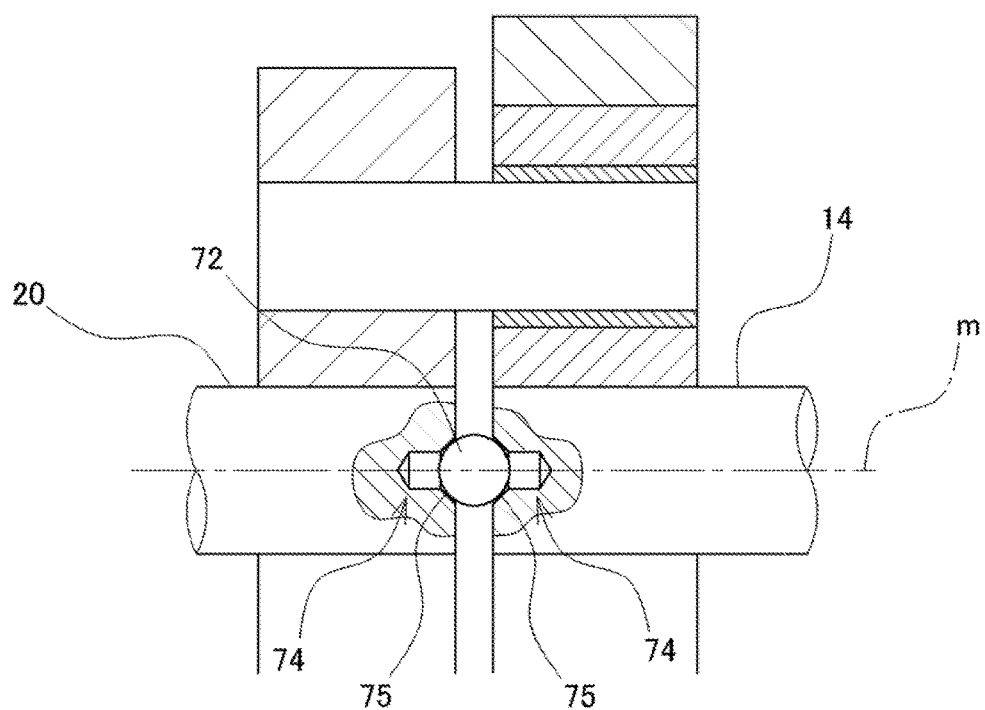
FIG. 4 is a schematic diagram illustrating a ball disposed directly between an output shaft and an input shaft.

As illustrated in FIG. 3, the planetary roller speed changer 10 includes a stationary ring 12, an input shaft 14, multiple planetary rollers 16, and a carrier 18. Although not illustrated in the drawings, the input shaft 14 is coupled to a motor, and an output shaft 20 that is part of the carrier 18 is coupled to, for example, a feeding device of a printer.

The stationary ring 12 is a ring plate and is formed by quench hardening high-carbon steel, such as bearing steel. The stationary ring 12 is concentric with the input shaft 14 and is located radially outward from the input shaft 14. The inner and outer peripheries of the stationary ring 12 are cylindrical surfaces and are concentric with each other. The inner periphery of the stationary ring 12 is shaped in a perfect round shape by grinding. Both axial end surfaces of the stationary ring 12 are parallel to each other and are perpendicular to the rotational axis m.

The input shaft 14 has a solid cylindrical shape and is formed by quench hardening high-carbon steel, such as bearing steel. The outer periphery of the input shaft 14 is shaped in a perfect round shape by grinding. Each axial end of the input shaft 14 has a center hole 74 formed therein (FIG. 3 illustrates only the center hole 74 in one axial end of the input shaft 14). The outer periphery of the input shaft 14 is grinded while the center holes 74 are supported.

In the planetary roller speed changer 10 according to the first embodiment, three planetary rollers 16 are disposed between the inner periphery of the stationary ring 12 and the outer periphery of the input shaft 14 and are circumferentially arranged at regular intervals. Each of the planetary rollers 16 has a cylindrical shape with a hole axially extending therethrough and is formed by quench hardening high-carbon steel, such as bearing steel. The outer peripheral surface of the planetary roller 16 is shaped in a perfect round shape by grinding. The outer periphery of the planetary roller 16 has a diameter slightly greater than a radial dimension (measured in radius) between the inner periphery of the stationary ring 12 and the outer periphery of the input shaft 14. Thus, the planetary rollers 16 are pressed with a predetermined contact pressure against the stationary ring 12 and the input shaft 14. The surfaces of the planetary rollers 16 in contact with the stationary ring 12 and the input shaft 14 are coated with traction oil. When the input shaft 14 rotates, a shearing force of the traction oil causes the planetary rollers 16 to revolve around the input shaft 14. The outer peripheral surfaces of the planetary rollers 16 are in rolling contact with the inner periphery of the stationary ring 12 and the outer periphery of the input shaft 14.

The carrier 18 includes a carrier plate 22, three drive pins 24, and the output shaft 20. The carrier plate 22 has a circular disk shape and is made of stainless steel. Each of the drive pins 24 has a solid cylindrical shape and is formed by quench hardening high-carbon steel, such as bearing steel. The outer periphery of the drive pin 24 is shaped in a perfect round shape by grinding. The drive pins 24 are assembled with the carrier plate 22 and are mounted vertically relative to side surfaces of the carrier plate 22. The drive pins 24 are located at an equal radial distance from the center of the carrier plate 22 and are circumferentially arranged at regular intervals. The drive pins 24 axially protrude to one side of the carrier plate 22 (to the right side of the carrier plate 22 in the example of FIG. 3).

The output shaft 20 has a solid cylindrical shape and is formed by quench hardening high-carbon steel, such as bearing steel. The outer periphery of the output shaft 20 is shaped in a perfect round shape by grinding. Each axial end of the output shaft 20 has a center hole 74 formed therein. The outer periphery of the output shaft 20 is grinded while the center holes 74 are supported. The output shaft 20 is mounted in the center of the carrier plate 22 and are parallel with the drive pins 24. The output shaft 20 axially protrudes from the carrier plate 22 in a direction opposite to the direction that the drive pins 24 protrude in. As such, the output shaft 20 and the three drive pins 24 are assembled together with the carrier plate 22. The output shaft 20 is rotatably supported concentrically with the rotational axis m by a rolling bearing 26 mounted in a front cover 25.

Each of the three drive pins 24 mounted on the carrier plate 22 is inserted in a hole defined by the inner periphery of a corresponding one of the planetary rollers 16. A thin cylindrical sleeve 28 is interferingly fitted on the outer periphery of each of the drive pins 24. The sleeve 28 is made of sintered material impregnated with oil. The planetary roller 16 is fitted on the sleeve 28 with a slight clearance between the inner periphery of the planetary roller 16 and the outer periphery of the sleeve 28, and the planetary roller 16 and the drive pin 24 are rotatable relative to each other. The sleeve 28 may be made of synthetic resin that has excellent sliding frictional properties, such as fluorine resin.

In the planetary roller speed changer 10, the planetary rollers 16 revolve with rotation of the input shaft 14, and the carrier 18 rotates on the rotational axis m with revolution of the planetary rollers 16. Since the revolution speed of the planetary rollers 16 is less than the rotation speed of the input shaft 14, the planetary roller speed changer 10 generates rotational output by reducing the speed of rotation of the motor.

Next, the portions where the input shaft 14 and the output shaft 20 face each other are described with reference to FIG. 1.

The axial end of the output shaft 20 facing toward the input shaft 14 has an end surface 35 provided with a center hole A (a first hole) concentric with the output shaft 20. The center hole A axially extends from the end surface 35 and has a predetermined length h1. The bottom of the center hole A (hereinafter, referred to simply as the "hole bottom a") is a flat surface that extends radially. An inside diameter d1 of the center hole A starts to increase at an opening portion of the center hole A toward the end surface 35 such that the opening portion of the center hole A has an inclined surface 30. That is, the center hole A may be provided by processing the center hole 74 formed in the axial end of the output shaft 20 that is closer to the input shaft 14.

The axial end of the input shaft 14 facing toward the output shaft 20 has an end surface 36 provided with a center hole B (a second hole) concentric with the input shaft 14. The center hole B axially extends from the end surface 36 and has a predetermined length h2. The bottom of the center hole B (a hole bottom b) is a flat surface that extends radially. An inside diameter d2 of the center hole B starts to increase at an opening portion of the center hole B toward the end surface 36 such that the opening portion of the center hole B has an inclined surface 31. That is, the center hole B may be provided by processing the center hole 74 formed in the axial end of the input shaft 14 that is closer to the output shaft 20. The inside diameter d2 of the center hole B is substantially equal to the inside diameter d1 of the center hole A. In an assembled state, the center hole A and the center hole B face each other and are substantially concentric with each other.

A pin (connection pin) 48 is inserted in the center hole A and the center hole B to connect the center hole A and the center hole B. The pin 48 is made of high-carbon steel and may be preferably quench hardened so as to have a hardness of about 60HRC. The pin 48 has a solid cylindrical shape, and each axial end of the pin 48 has a substantially spherical end surface 40 that is axially convex.

The pin 48 has a predetermined entire length L that is greater than the sum of the axial length h1 of the center hole A and the axial length h2 of the center hole B. In short, L>h1+h2. Thus, even when the planetary rollers 16 are skewed such that the output shaft 20 and the input shaft 14 axially approach each other, the output shaft 20 and the input shaft 14 do not come into contact with each other. Since the pin 48 having the entire length L is interposed between the output shaft 20 and the input shaft 14, the hole bottom a and the hole bottom b abut against the pin 48 before the output shaft 20 and the input shaft 14 come into contact with each other. When the output shaft 20 and the input shaft 14 axially approach closest to each other, the end surface 35 of the output shaft 20 and the end surface 36 of the input shaft 14 face each other with a clearance s1 therebetween that is given by the following equation: s1=L−(h1+h2).

An outside diameter d0 of the pin 48 is slightly smaller than each of the inside diameter d1 of the center hole A and the inside diameter d2 of the center hole B. Thus, manual insertion of the pin 48 into the center hole A and center hole B is facilitated. This facilitates assembling the output shaft 20 and the input shaft 14 into the planetary roller speed changer 10 with the pin 48 inserted in the center hole A and the center hole B.

The outside diameter d0 of the pin 48 is smaller than each of the inside diameter d1 of the center hole A and the inside diameter d2 of the center hole B. Thus, the pin 48 is free to rotate concentrically with the center hole A and the center hole B inside the center hole A and the center hole B. In the planetary roller speed changer 10, since the rotation speed of the input shaft 14 is reduced before being transferred to the output shaft 20, the output shaft 20 and the input shaft 14 rotate relative to each other. The relative rotation causes relative rotational displacement between the pin 48 and at least one of the output shaft 20 and the input shaft 14. According to the first embodiment, since the end surface 40 of the pin 48 is spherical; whereas the hole bottoms a and b are flat, the pin 48 abuts against each of the hole bottoms a and b substantially at one point on the rotational axis m. Thus, when the pin 48 rotates relative to the output shaft 20 and the input shaft 14, running torque caused by friction at a contact portion therebetween is very small. This effectively restrains irregular rotation of the output shaft 20 even when the output shaft 20 and the input shaft 14 approach so close to each other that the pin 48 abuts against the hole bottoms a and b. Since the pin 48 is quench hardened, the contact portion of the pin 48 is less likely to wear.

Depending on the direction that the planetary rollers 16 are skewed in, the input shaft 14 may be axially displaced in a direction away from the output shaft 20 by an amount of about one millimeter. In the related art (refer to FIG. 3), the ball 72 is disposed between the output shaft 20 and the input shaft 14. The ball 72 is supported by the inclined surface 75 only over about half of the diameter of the ball 72. Therefore, the ball 72 may come off easily when the input shaft 14 is displaced in the direction away from the output shaft 20. In contrast to the related art structure, according to the first embodiment, the sum of the axial length h1 of the center hole A and the axial length h2 of the center hole B is much greater than the displacement amount by which the input shaft 14 may be displaced in the direction away from the output shaft 20. This ensures that both axial ends of the pin 48 are always supported by the center hole A and the center hole B. Thus, even when the input shaft 14 is displaced in the direction away from the output shaft 20, the pin 48 does not come off. This helps to prevent the pin 48 from coming off while the planetary roller speed changer 10 is assembled, thus making it possible to assemble the planetary roller speed changer 10 reliably.

In the above description, the pin 48 is mounted in the center hole A and the center hole B such that there is a clearance between the pin 48 and each of the center hole A and the center hole B. Alternatively, the pin 48 may be press-fitted in one of the center hole A and the center hole B. Although not illustrated in the drawings, for example, the pin 48 may be press-fitted in the center hole A in the output shaft 20 as follows.

The inside diameter d1 of the center hole A is slightly smaller than the outside diameter d0 of the pin 48. The pin 48 is press-fitted in the center hole A. The pin 48 protrudes from the axial end of the output shaft 20 by a predetermined dimension h5. The inside diameter d2 of the center hole B in the input shaft 14 is slightly greater than the outside diameter d0 of the pin 48. This facilitates manually inserting the pin 48 into the center hole B, thus facilitating assembling the output shaft 20 and the input shaft 14 together. The axial length h2 of the center hole B is smaller than the dimension h5 by which the pin 48 protrudes. When the output shaft 20 and the input shaft 14 axially approach each other, the hole bottom b abuts against the pin 48 before the output shaft 20 and the input shaft 14 come into contact with each other. As such, the pin 48 interposed between the output shaft 20 and the input shaft 14 allows the output shaft 20 and the input shaft 14 to avoid coming into contact with each other.

Since the outside diameter d0 of the pin 48 is slightly smaller than the inside diameter d2 of the center hole B, the output shaft 20 and the input shaft 14 are rotatable relative to each other. At this time, since the end surface 40 of the pin 48 abuts against the hole bottom b substantially at one point on the rotational axis m, running torque caused by friction at the contact portion is very small. This effectively restrains irregular rotation of the output shaft 20. When an interference between the pin 48 and the center hole A is set large enough to keep the pin 48 in place, the end surface 40 of the pin 48 does not abut against the hole bottom a.

As can be seen from the above description, according to the first embodiment, the planetary roller speed changer 10 allows the output shaft 20 and the input shaft 14 to be axially placed in position by simple structure. This reduces assembly man-hours and manufacturing cost.

Figure 2:
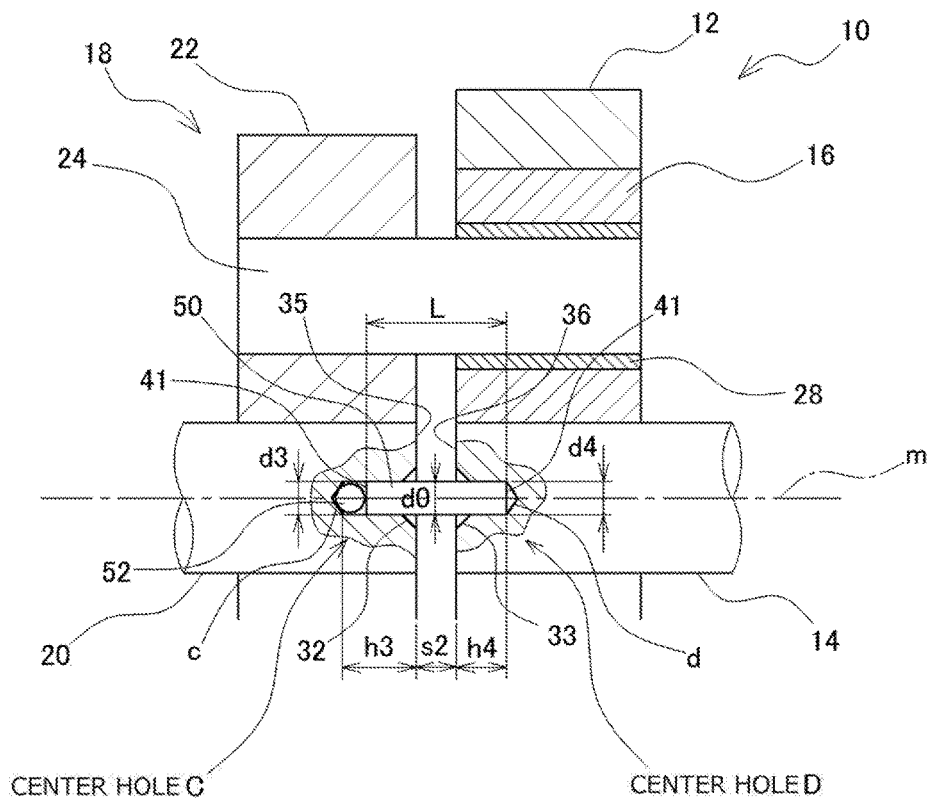
FIG. 2 is an enlarged, axial cross-sectional view illustrating a main part according to a second embodiment of the invention.

A second embodiment of the invention is described in detail with reference to the drawings. FIG. 2 is an enlarged, axial cross-sectional view illustrating a main part according to the second embodiment. The second embodiment differs from the first embodiment in that a ball 52 is located in a center hole in one of the input shaft 14 and the output shaft 20. The other structures are the same as those of the first embodiment. The structures common to the first and second embodiments are briefly described, and the structure unique to the second embodiment is described in detail.

According to the second embodiment, the axial end of the output shaft 20 facing toward the input shaft 14 has an end surface 35 provided with a center hole C (a first hole) concentric with the output shaft 20. The center hole C axially extends from the end surface 35 and has a predetermined length h3. The center hole C is a drilled hole, and the bottom of the center hole C (a hole bottom c) is conical. An inside diameter d3 of the center hole C starts to increase at an opening portion of the center hole C toward the end surface 35 such that the opening portion of the center hole C has an inclined surface 32.

The axial end of the input shaft 14 facing toward the output shaft 20 has an end surface 36 provided with a center hole D (a second hole) concentric with the input shaft 14. The center hole D axially extends from the end surface 36 and has a predetermined length h4. The center hole D is a drilled hole, and the bottom of the center hole D (a hole bottom d) is conical. An inside diameter d4 of the center hole D starts to increase at an opening portion of the center hole D toward the end surface 36 such that the opening portion of the center hole D has an inclined surface 33. The inside diameter d4 of the center hole D is substantially equal to the inside diameter d3 of the center hole C. In an assembled state, the center hole C and the center hole D face each other and are substantially concentric with each other.

A pin (connection pin) 50 is inserted in the center hole C and the center hole D to connect the center hole C and the center hole D. The pin 50 is made of high-carbon steel and may be preferably quench hardened so as to have a hardness of about 60HRC. The pin 50 has a solid cylindrical shape, and each axial end of the pin 50 has a flat surface perpendicular to the rotational axis m. The ball 52 is inserted between the pin 50 and the hole bottom c. Preferably, the ball 52 may be made of metal, such as high-carbon steel, and be quench hardened so as to have a hardness of about 60HRC. Alternatively, the ball 52 may be made of ceramic, such as silicon nitride or silicon carbide. A diameter db of the ball 52 is slightly smaller than the inside diameter d3 of the center hole C. This facilitates manually inserting the ball 52 into the center hole C.

The sum of an entire length L of the pin 50 and the diameter db of the ball 52 is greater than the sum of the axial length h3 of the center hole C and the axial length h4 of the center hole D. In short, L+db>h3+h4. Thus, even when the planetary rollers 16 are skewed such that the output shaft 20 and the input shaft 14 axially approach each other, the output shaft 20 and the input shaft 14 do not come into contact with each other. The pin 50 having the entire length L is interposed between the output shaft 20 and the input shaft 14. Before the output shaft 20 and the input shaft 14 come into contact with each other, the pin 50 abuts against the hole bottom c via the ball 52 while abutting against the hole bottom d. When the output shaft 20 and the input shaft 14 axially approach closest to each other, the end surface 35 of the output shaft 20 and the end surface 36 of the input shaft 14 face each other with a clearance s2 therebetween that is given by the following equation: s2=L+db−(h3+h4).

An outside diameter d0 of the pin 50 is slightly smaller than each of the inside diameter d3 of the center hole C and the inside diameter d4 of the center hole D. Thus, manual insertion of the pin 50 into the center hole C and the center hole D is facilitated. This facilitates assembling the output shaft 20 and the input shaft 14 into the planetary roller speed changer 10 with the pin 50 inserted in the center hole C and the center hole D.

The outside diameter d0 of the pin 50 is smaller than each of the inside diameter d3 of the center hole C and the inside diameter d4 of the center hole D. Thus, the pin 50 is free to rotate concentrically with the center hole C and the center hole D inside the center hole C and the center hole D. According to the second embodiment, an end surface 41 of the pin 50 is in contact with the ball 52 inside the center hole C. The pin 50 and the ball 52 abut against each other substantially at one point on the rotational axis m. Thus, when the pin 50 rotates relative to the output shaft 20, running torque caused by friction at a contact portion therebetween is very small. In the center hole D, the entire circumference of the pin 50 is in contact with the hole bottom d. Thus, running torque caused by friction at the contact portion between the pin 50 and the center hole D is relatively large, so that the pin 50 and the input shaft 14 do not rotate relative to each other. As such, according to the second embodiment, when the output shaft 20 and the input shaft 14 axially approach each other, the pin 50 abuts against the hole bottom c via the ball 52. This effectively restrains irregular rotation of the output shaft 20. Since the pin 50 and the ball 52 are quench hardened, contact portions of the pin 50 and the ball 52 are less likely to wear.

The sum of the axial length h3 of the center hole C and the axial length h4 of the center hole D is much greater than a displacement amount (about one millimeter) by which the input shaft 14 may be displaced in the direction away from the output shaft 20 when the planetary rollers 16 are skewed. Thus, even when the input shaft 14 is displaced in the direction away from the output shaft 20, both of the axial ends of the pin 50 remain supported by the center hole C and the center hole D. As such, the pin 50 does not come off. Since the ball 52 is disposed between the pin 50 and the hole bottom c, the ball 52 does not come off either. These help to prevent the pin 50 and the ball 52 from coming off while the planetary roller speed changer 10 is assembled, thus making it possible to assemble the planetary roller speed changer 10 reliably.

According to the second embodiment, the ball 52 is disposed between the pin 50 and the hole bottom c. Alternatively, the ball 52 may be inserted between the pin 50 and the hole bottom d or may be inserted between the pin 50 and each of the hole bottom c and the hole bottom d. Like in the first embodiment, the end surface 41 of the pin 50 may be substantially spherical. In this case, since the surface of the ball 52 and the end surface 41 of the pin 50 are each convex, the pin 50 abuts against the ball 52 substantially at one point on the rotational axis m when they abut against each other. Thus, when the pin 50 rotates relative to the output shaft 20 and the input shaft 14, running torque caused by friction at a contact portion therebetween is very small.

As can be seen from the above description, according to the second embodiment, the planetary roller speed changer 10 allows the output shaft 20 and the input shaft 14 to be axially placed in position by simple structure. This reduces assembly man-hours and manufacturing cost. Further, the disposed ball 52 more reliably reduces friction at the contact portion between the pin 50 and the output shaft 20.

As described above, the invention provides a planetary roller speed changer that allows an output shaft and an input shaft to be axially placed in position by simple structure, thus reducing assembly man-hours and manufacturing cost.

What is claimed is:

1. A planetary roller speed changer comprising:
   an input shaft;
   a stationary ring concentric with the input shaft and located radially outward from the input shaft;
   a plurality of planetary rollers disposed between the input shaft and the stationary ring and in rolling contact with an outer periphery of the input shaft and an inner periphery of the stationary ring;
   a plurality of drive pins each inserted in a space defined by an inner periphery of a corresponding one of the plurality of planetary rollers;
   a carrier that supports the plurality of drive pins together;
   an output shaft concentric with the input shaft and fixed to the carrier; and
   a connection pin, wherein
   an axial end of the output shaft facing toward the input shaft has a first hole that is concentric with the output shaft and that axially extends to a predetermined depth,
   an axial end of the input shaft facing toward the output shaft has a second hole that is concentric with the input shaft and that axially extends to a predetermined depth,
   the connection pin is inserted in the first hole and the second hole to connect the first hole and the second hole, and
   when the output shaft and the input shaft axially approach each other, the connection pin interposed between the output shaft and the input shaft allows the output shaft and the input shaft to avoid coming into contact with each other.

2. The planetary roller speed changer according to claim 1, further comprising:
   a ball disposed between the connection pin and a bottom of at least one of the first hole and the second hole.

3. The planetary roller speed changer according to claim 1, wherein
   the first hole is a center hole used to support the axial end of the output shaft when an outer periphery of the output shaft is grinded, and
   the second hole is a center hole used to support the axial end of the input shaft when an outer periphery of the input shaft is grinded.

4. The planetary roller speed changer according to claim 1, wherein
   an outside diameter of the connection pin is smaller than an inside diameter of each of the first hole and the second hole.

* * * * *